W. A. SHEPHARD.
MILK COOLING AND BOTTLING APPARATUS.
APPLICATION FILED MAR. 5, 1912.
1,048,597.
Patented Dec. 31, 1912.
3 SHEETS—SHEET 1.
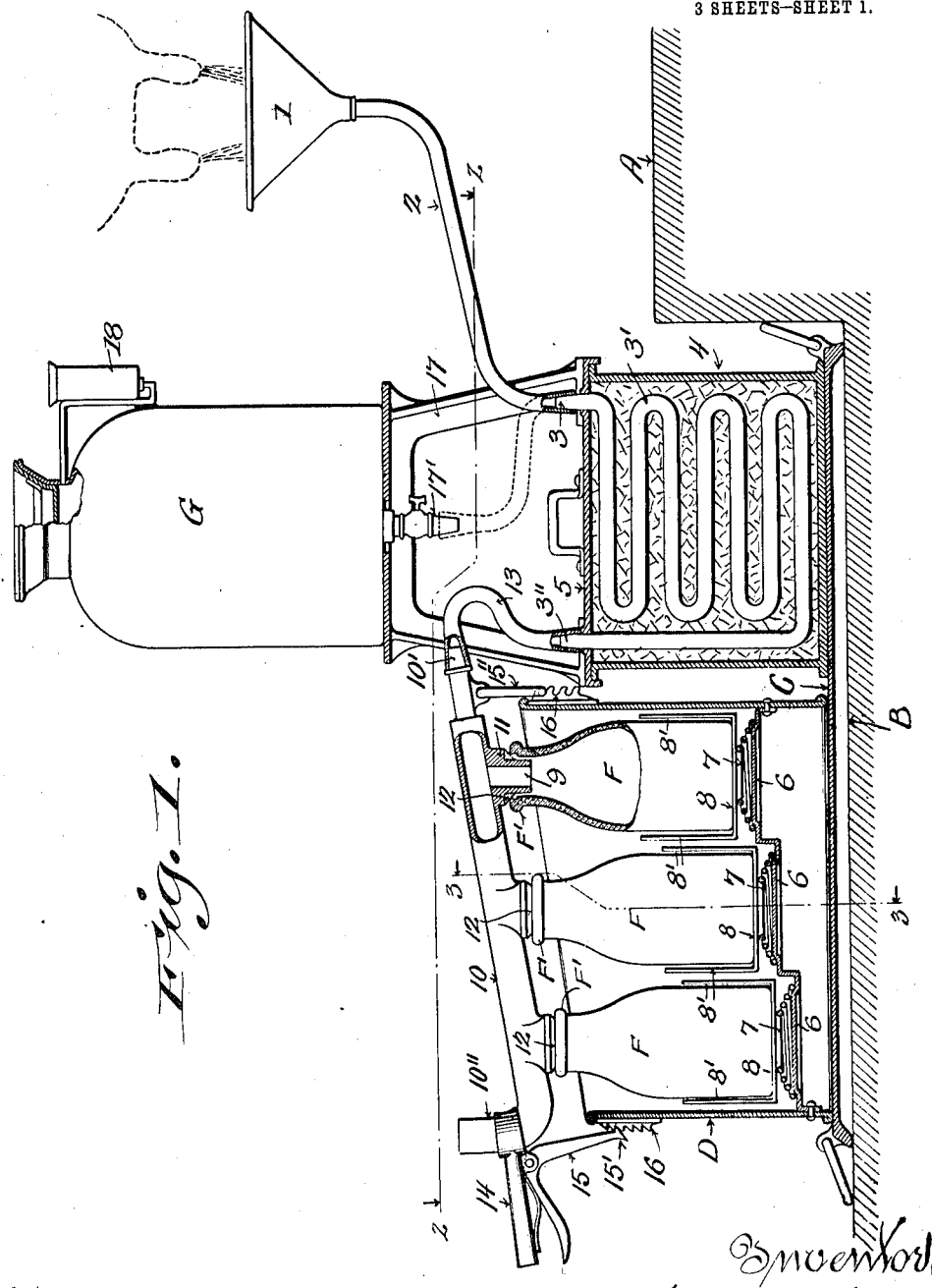

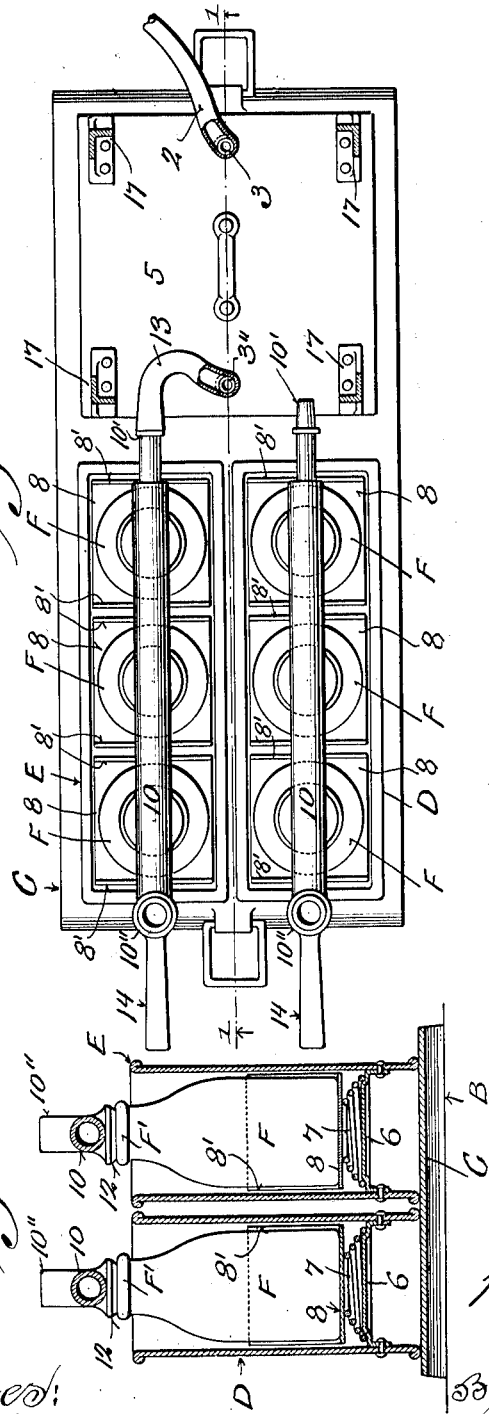

W. A. SHEPHARD.
MILK COOLING AND BOTTLING APPARATUS.
APPLICATION FILED MAR. 5, 1912.
1,048,597.
Patented Dec. 31, 1912.
3 SHEETS—SHEET 3.
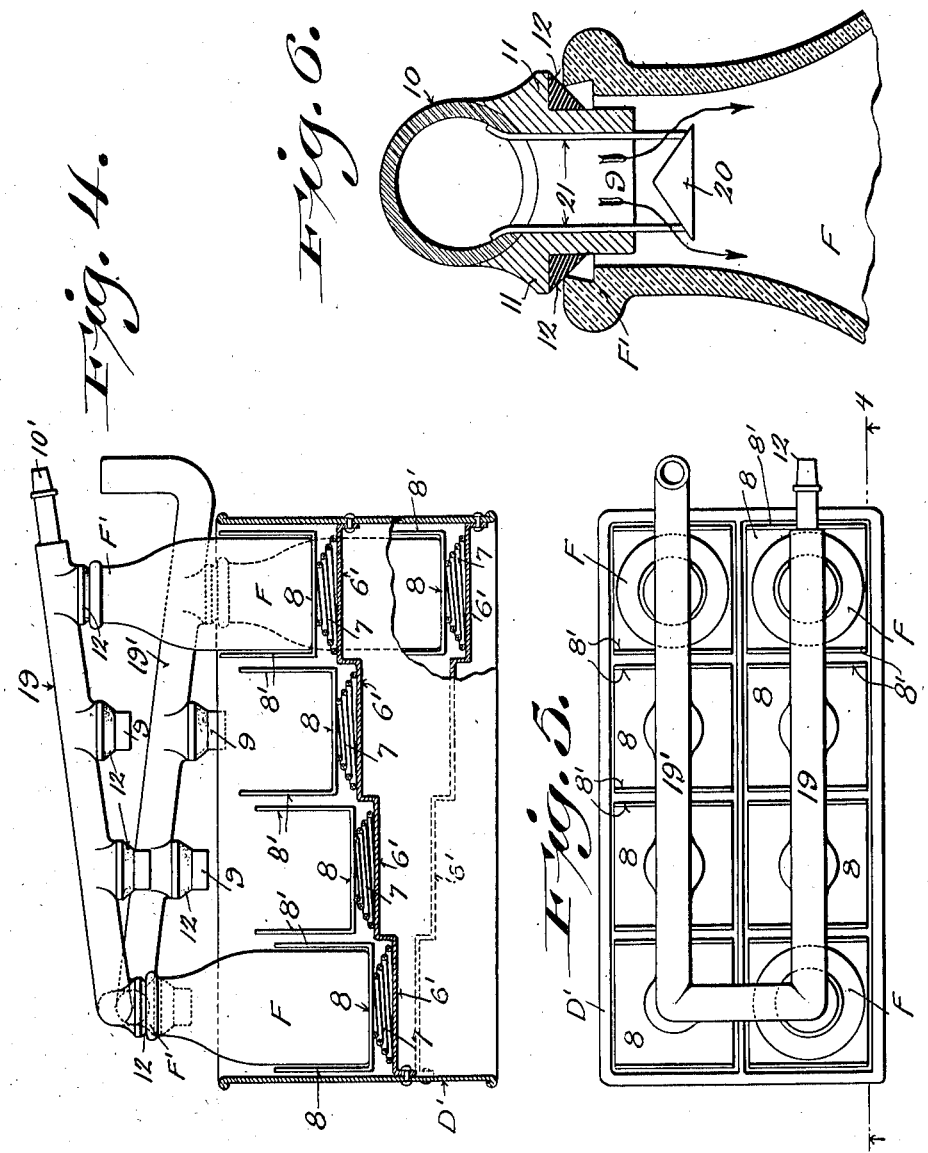

UNITED STATES PATENT OFFICE.

WILLIAM A. SHEPHARD, OF WAUKESHA, WISCONSIN.

MILK COOLING AND BOTTLING APPARATUS.

1,048,597.  Specification of Letters Patent.  Patented Dec. 31, 1912.

Application filed March 5, 1912. Serial No. 681,808.

*To all whom it may concern:*

Be it known that I, WILLIAM A. SHEPHARD, a citizen of the United States, and resident of Waukesha, in the county of Waukesha and State of Wisconsin, have invented certain new and useful Improvements in Milk Cooling and Bottling Apparatus; and I do hereby declare that the following is a full, clear, and exact description thereof.

The object of my invention is to provide a simple, economical, effective and sanitary apparatus for direct treatment of milk and bottling the same at the point of milking, thus reducing the danger of infection to a minimum which is largely due to the multiplicity of handling operations usually employed in a dairy whereby the milk is exposed many times to atmospheric contamination and also rendered liable to the reception of impurities with each change of containing vessels.

Primarily the apparatus comprises a portable cooler and tray containing one or more series of bottles upon different elevations, the entire device being at such elevation relative to the cow that the milk therefrom may be directly discharged through pipe connections to the bottles comprising the original package. Thus the milk is cooled in its flow by gravity to said bottles without being exposed to the atmosphere except as it flows from the cow into the milking vessel.

Specific objects of my invention are to provide detachable inclined pipe sections having a series of nozzles which serve as closures for the milk bottles; to provide means for locking the pipe sections to the mouths of the bottles whereby the nozzles will be tightly seated therein; to provide sectional trays for the milk bottles whereby a filled battery of bottles can be removed, the milk being then switched into an empty battery incidental to removal of the filled series; to provide spring-controlled bottle-seats for the tray whereby the mouths of the bottles will be automatically adjusted to the nozzles of the pipe section; to provide a reservoir in connection with the apparatus whereby in some instances the milk from the cows may be received in separate vessels and emptied into the reservoir which reservoir is conveniently located relative to the cows; to provide means in connection with the pipe section nozzles whereby the milk is aerated incidental to its discharge into the bottles.

With the above and other objects in view the invention consists in certain peculiarities of construction and combination of parts as hereinafter set forth with reference to the accompanying drawings and subsequently claimed.

In the drawings Figure 1 represents a longitudinal sectional view of a milk-treating apparatus embodying the features of my invention with parts broken away and parts in section to more clearly illustrate certain structural features; Fig. 2, a plan view of the same partly in section as indicated by line 2—2 of Fig. 1; Fig. 3, a cross-section of the bottle-tray, the section being indicated by line 3—3 of Fig. 1; Fig. 4, a side elevation of a double inclined pipe section, the same being adapted to supply milk by gravity to two rows of bottles which are arranged to be seated within a tray having supports that are stepped in opposite directions, the supports and bottles being diagrammatically indicated in connection with the pipe section; Fig. 5, a plan view of the double inclined pipe section, and Fig. 6, an enlarged detail cross-sectional view of one of the bottle-closure nozzles, the same being shown fitted to the mouth of a bottle and provided with a milk aerating deflector.

Referring by characters to the drawings, 1 represents a milk-receiving vessel, which vessel is supported in the ordinary manner to receive the milk directly from the teats of the cow. The vessel is shown in funnel-shape and is provided with a flexible pipe connection 2 which leads from its bottom to the receiving end 3 of a coil of pipe 3', which pipe is seated in a box 4 which serves as a retainer for ice or other cooling medium, the box being provided with a detachable lid 5, through which the receiving end and the discharge end 3'' of the cooling pipe project, this apparatus constituting a cooler. The floor of the animal stall A, as shown, is slightly elevated above the rear runway floor-line B, which runway floor serves as a support for a portable table C that carries the refrigerator box 4. This table also carries a detachable bottle tray, which tray, as shown, is formed in separable sections D, E, respectively, positioned side by side. These tray sections are in every respect similar and are provided with progressively stepped bottle-supporting seats 6, the highest seat being adjacent to the cooling box as shown. Each of the bottle supporting seats has mounted thereon a helical spring 7, which spring in turn supports a bottle-receiving shell 8, the same having wings 8' arranged longitudinally of the tray. The outer faces of the first and last wings of the shells are adapted to engage the inner walls of the tray while the intermediate wings have sliding play relative to each other. The transverse edges of the shell-wings engage the side walls of the tray, to prevent lateral play thereof.

As best shown in Fig. 1, when the apparatus is in operation each of the shells have seated therein a milk bottle F, the mouths F' of which are progressively stepped downwardly from the cooler. Fitted into the bottle mouths are nozzles 9, which nozzles communicate with and extend from an inclined pipe section 10. The nozzles project into the mouths of the bottles and are provided with shoulder flanges 11 for the reception of taper faced gaskets 12, which gaskets are fitted over the nozzles, their tapered faces being adapted to impinge against the lipped edge of the bottle mouths whereby a tight joint is formed, the gaskets being preferably composed of rubber or other yieldable material. The inner or high feed end of the pipe section 10, which is adjacent to the cooler, terminates with a tapered nose 10' for the purpose of forming a coupling connection with a hose section 13, the opposite end of which hose section is similarly coupled to the discharge end 3" of the cooler coil 3'. The lower outer end 10" of the pipe section is curled up as shown and open to form a vent, to which end is secured a handle 14 that has a spring-controlled gripping dog 15 in connection therewith. The inner end of the pipe section has pivoted thereto a link 15', the lower bar of which link is adapted to engage any one of a series of teeth of a rack-plate 16, which rack-plate is secured to the end-wall of the tray. The opposite end-wall of the tray adjacent to the lower end of the pipe section is provided with a similar toothed rack 16' for locking engagement with a nose end 15" of the spring-controlled dog. Thus it will be seen that the pipe section is detachable from the tray and can readily be inserted in place by first coupling the link 15 to the tray and thereafter the handle 14 is forced downwardly. The pipe nozzles 9 are thus caused to enter the mouths of the milk bottles and when the pipe section is moved down by pressure exerted upon the handle all of the bottles move down correspondingly in opposition to their spring-controlled seats, whereby a tight joint between the nozzles and bottle-mouths is effected, the pipe section being locked in its depressed position by engagement with the nose 15" of the spring-controlled dog with any one of the series of teeth of rack 16'.

While I have shown and described this specific form of locking the inclined pipe section in position with respect to the tray, it is apparent that any form of locking mechanism within the knowledge of skilled mechanics can be employed for obtaining this same result without departing from the spirit of my invention. It will also be understood that while I have shown the bottle-tray as being composed of two sections that the series may be increased indefinitely.

In the operation of the device milk from the teats will travel by gravity to the cooler coil and fill up the same, causing the milk to rise in the coupling pipe 13 and from thence said milk will flow by gravity down the inclined pipe section in a thin stream until it reaches the first pipe nozzle through which it will discharge into the first bottle, displacing the air at the same time, which air will travel out through the nozzle and be vented at the rear end of the pipe section. After the first bottle is filled the milk will overflow and travel to the next nozzle whereby it is trapped into the bottle fitted thereto. This operation is repeated until the entire series of stepped bottles have been filled by gravity. It is apparent that as the milk flows slowly through the cooling coil the animal heat is extracted therefrom and said milk when discharged into the bottles is ready for corking in the usual manner, said bottles forming original packages for delivery. After the bottles have been filled in this tray section, the flexible hose connection 13 is uncoupled from the inclined pipe and coupled to the pipe of the next section, the bottles in which will then be filled while the operator removes the filled tray section to the milk-house.

It is apparent that if desired the pipe section 10 just described in connection with filling the first tray section, in some instances may be uncoupled after the bottles are filled and shifted to the bottles of the empty tray section without uncoupling the pipe section 10 from the cooling coil, by which arrangement only one nozzled pipe section may be employed in place of providing a separate nozzled pipe section for each tray section, as shown. It should also be understood that while I have shown one milking vessel in flexible connection with the cooler that one or more branched flexible pipe sections to the cooler may be employed having milking vessels at their ends whereby two or more cows may be milked simultaneously, the apparatus being located conveniently with relation to the group of cows. Furthermore it will be observed that owing to the cows being upon a higher elevation than the milk-treating apparatus, that all of the milk will flow by gravity to the bottles, except that in the cooling coil. As shown in Fig. 1 I also provide a milk-receiving reservoir G, which reservoir is located upon a higher plane than the milk-receiving apparatus and in this instance is shown mounted upon a spider 17 that is supported upon the top of the cooler. The bottom of the reservoir is provided with a valve-controlled discharge nozzle 17', which nozzle is adapted to be coupled to the receiving end of the cooler coil when it is not desirable to milk directly therein. This reservoir is provided for the purpose of emptying milk from pails of the milker directly therein and is particularly adapted for use wherein it is not practical or desirable to locate the apparatus upon a plane that is sufficiently low to receive the milk by gravity that is milked direct from the teats of the cow. This reservoir is provided with an air purifying cartridge 18, which cartridge is in pipe connection with the upper end of the reservoir as shown. When the reservoir is filled with milk the valve in the bottom nozzle thereof is opened and as the milk flows by gravity through the apparatus air is admitted to the reservoir or can through the mouth of the air-purifying cartridge and said cartridge being filled with any desirable antiseptic chemical the air which passes therethrough is thoroughly sterilized before it enters the can and contacts with the milk, thus insuring the milk against contamination. Hence in this method of treating the milk, it is only subjected to contact with the air during the milking operation and during the short interval that it is being poured from the milking vessel into the reservoir.

Figs. 4 and 5 of the drawings illustrate a looped form of nozzled circulating pipe having legs 19, 19', that are inclined in opposite directions, the intake end of the loop of the pipe being at the highest point. This inclined pipe coil is designed to be applied to bottles contained in a bottle-receiving tray D' having stepped bottle-seats 6' which parallel the legs of the pipe, the same being inclined in opposite directions in compartments provided in the tray. The nozzles of this modified form of gravity supply pipe may be coupled to the mouths of the bottles by a connection with the tray in any suitable manner not shown. It is obvious that the number of bottles stepped progressively in alinement may be indefinite, depending upon the height of the first bottle with respect to the highest point of the feed.

Fig. 6 illustrates a cross-section of a pipe nozzle provided with a detachable deflector 20, which deflector is suspended in alinement with the nozzle by wire legs 21 that are connected to the deflector and fitted within said nozzle as shown, the means of connecting the deflector forming no part of my invention. The deflector is provided for the purpose of aerating the milk as it is discharged into the bottle whereby said milk will be caused to flow in a thin sheet as it is broken up by contact with the conical point of said deflector and thus presenting a large surface area through which the air that is expelled from the bottle will pass. It is apparent that when bottles of one section of the tray are all filled that each pipe section nozzle will be filled with milk to the height of the bottom of the pipe and hence when the pipe section with its nozzles is removed from the mouths of the bottles this column of milk will be deposited within the bottle to fill the same to the desired height which was not completely filled prior thereto owing to the fact of the nozzle displacement. Thus the nozzles are thoroughly drained. It will also be thoroughly understood that after the milking operation has been completed that the amount of milk contained within the pipe coil 3' can readily be drained by removing the coil from the box 4 and inverting the same, it being further understood that after the operation all of the parts are thoroughly sterilized.

In the accompanying illustrations the trays are shown arranged for the reception of, for example, quart bottles, and in some instances where it is desired to use smaller bottles, or pints, or half-pints, it is apparent that I may readily insert skeleton blocks within the shells 8 to raise the bottle seat, whereby the mouths of smaller bottles will be brought into the same position as those shown in order that the feed-pipe section nozzles may be adjusted to the mouths of said smaller bottles.

I claim:

1. A milk cooling and bottling apparatus comprising a bottle-tray having a series of progressively stepped bottle-seats therein, a vented detachable inclined feed-pipe section having a series of discharge nozzles and adapted to form closures for bottles, a cooler in communication with the high end of the feed-pipe, and milk-receiving means in communication with the cooler.

2. A milk-cooling and bottling apparatus comprising a bottle-tray having a series of progressively stepped yieldable bottle-seats, a vented detachable inclined feed-pipe section having a series of discharge nozzles adapted to form closures for the bottles, a cooler in communication with the upper end of the feed-pipe, the cooler being disposed below said upper feed pipe end, and a milking vessel in communication with the cooler, the milking vessel being disposed upon a higher plane than the said cooler and bottle-tray.

3. A milk cooling and bottling apparatus comprising a receiving vessel, a cooler located below the plane thereof, a flexible connection between the cooler and receiving vessel, a downwardly inclined pipe section in communication with the cooler whereby milk from said receiving vessel is adapted to overflow the cooler and thereafter flow by gravity through the inclined pipe section, a series of nozzles extending from said pipe section, a bottle-tray disposed under the aforesaid pipe section having progressively stepped bottle-seats in approximate alinement with the pipe nozzles, and a series of bottles positioned upon the tray seats for the reception of milk progressively, their mouths being closed by the pipe nozzles.

4. A milk cooling and bottling apparatus comprising a bottle-tray having a series of progressively stepped bottle-seats therein, a vented inclined feed pipe section having a series of discharge nozzles adapted to form closures for the mouths of the bottles mounted upon the tray-seats, a cooler in communication with the high end of the feed pipe, and milk receiving means in communication with said cooler.

5. A milk cooling and bottling apparatus comprising a bottle-tray having a series of progressively stepped bottle-seats therein, a vented inclined feed pipe section having a series of discharge nozzles adapted to form closures for the mouths of the bottles mounted upon the tray-seats, a milk deflector carried by each nozzle, a cooler in communication with the high end of the feed pipe, and milk receiving means in communication with said cooler.

6. A milk cooling and bottling apparatus comprising a cooler, a milking vessel in flexible connection with the cooler, the milking vessel being above the plane of said cooler, a portable bottle-tray having a series of progressively stepped bottle-seats in juxtaposition to the cooler, a vented feed-pipe section having a series of discharge nozzles adapted to form closures for bottles seated progressively upon the different planes within the tray whereby the pipe section is inclined, means for detachably securing the pipe section and tray together, and a detachable coupling pipe connecting the high end of the pipe section and cooler.

In testimony that I claim the foregoing I have hereunto set my hand at Milwaukee in the county of Milwaukee and State of Wisconsin in the presence of two witnesses.

WILLIAM A. SHEPHARD.

Witnesses:
G. W. YOUNG,
M. E. DOWNEY.